Figure 1:
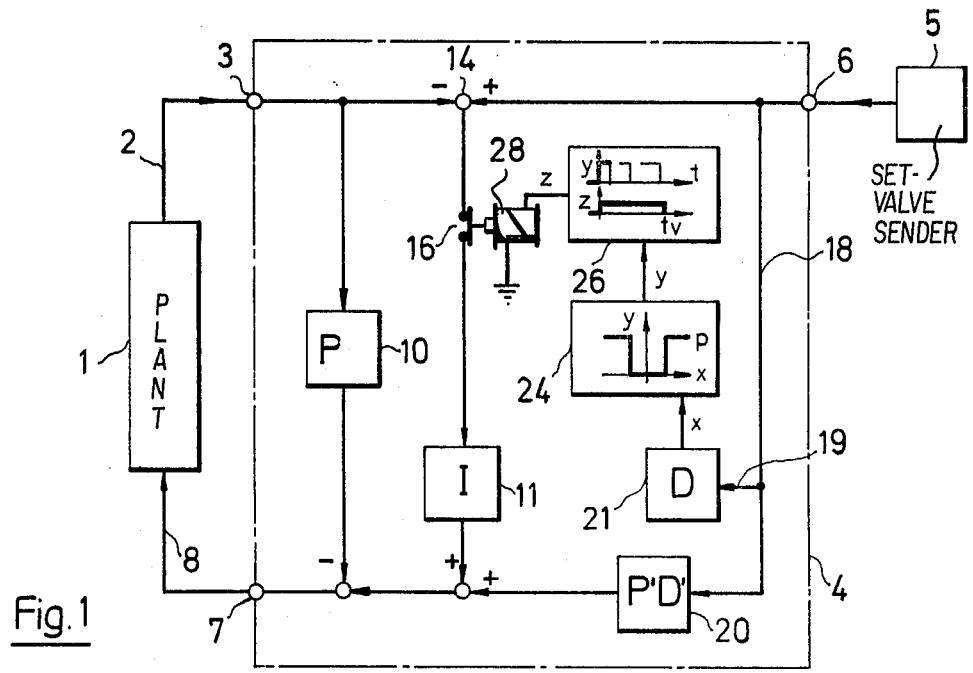

United States Patent [19]

Herzog

[11] 4,415,966
[45] Nov. 15, 1983

[54] CONTROL CIRCUIT FOR A CONTROLLER AND A METHOD OF OPERATING THE SAME

[75] Inventor: Rudolf Herzog, Tobel, Switzerland
[73] Assignee: Sulzer Brothers Limited, Winterthur, Switzerland
[21] Appl. No.: 242,225
[22] Filed: Mar. 10, 1981
[30] Foreign Application Priority Data
Mar. 19, 1980 [CH] Switzerland ............... 2156/80
[51] Int. Cl.³ ........................................... G05B 11/42
[52] U.S. Cl. ................................. 364/162; 318/610; 364/161; 364/183; 364/184
[58] Field of Search .............. 364/161, 162, 183, 184, 364/166; 318/561, 609, 610, 611

[56] References Cited
U.S. PATENT DOCUMENTS

| | | | |
|---|---|---|---|
| 3,495,074 | 2/1970 | Jacques | 364/161 X |
| 3,646,454 | 2/1972 | Southern | 364/161 X |
| 3,819,999 | 6/1974 | Platt | 318/609 |
| 3,938,017 | 2/1976 | Hayes | 318/610 |
| 4,276,603 | 6/1981 | Beck et al. | 364/162 X |

Primary Examiner—Joseph F. Ruggiero
Attorney, Agent, or Firm—Kenyon & Kenyon

[57] ABSTRACT

The method serves to control sluggishly reacting plants by controllers in which rapid changes in set value occur. The controller has an integral section and a proportional section separate from the I-section. The I-section receives a control deviation signal formed from the actual value and the set value, whereas the P-section is supplied with the set value. The output signals of the I-section and of the P-section act on the plant. The I-section is blocked for the duration of an abrupt change in the set value.

As a result of this relatively short interruption in operation of the I-section, the control of the plant is improved.

6 Claims, 2 Drawing Figures

CONTROL CIRCUIT FOR A CONTROLLER AND A METHOD OF OPERATING THE SAME

This invention relates to a control circuit for a controller and a method of operating the same.

As is known, various types of controllers have been known for controlling the output of a plant. For example, it has been known to construct a controller with inputs to receive an actual value signal from a plant and a set value signal from a suitable source as well as an integral (I) section and a separate proportional (P) section for processing these signals. In a known control circuit, during operation, a control deviation signal is formed corresponding to the difference between the set value signal and the actual value signal. This deviation signal is then supplied to the I-section while the set value signal is supplied to the separate P-section. The I-section and P-section thus produce output signals which are able to act on the plant to control the operation of the plant. However, if the set value signal is abruptly or quickly changed, in a case of a sluggishly reacting plant the controller is overshooting.

In order to improve the operation of such controllers in controlling a plant, it has been known to provide a delay element in the controller in the path between the source of the set value and the I-section so that the set value signal applied to the I-section experiences a delay. This arrangement considerably improves the control but means that the characteristic of the plant must be known quantitatively since the delay element must be approximately adapted to this characteristic. As a rule, the apparatus required for the delay element is costly and its appropriate dimensioning requires detailed knowledge concerning the control behaviour of the plant.

Accordingly, it is an object of the invention to provide a simplified control circuit for a controller to accommodate abrupt changes in set value signal.

It is another object of the invention to obviate control oscillations due to abrupt or rapid changes in set value signal in controllers for controlling a plant.

It is another object of the invention to provide a method of avoiding control oscillations in a sluggishly reacting plant.

Briefly, the invention provides a control circuit for a controller and a method for controlling a sluggishly reacting plant.

The control circuit is comprised of a set value input for receiving a set value signal, an actual value input for receiving an actual value signal from an output of a plant and an output for delivering a control signal to an input of the plant. In addition, the circuit includes a subtraction station which is connected to each input for subtracting the actual value signal from the set value signal in order to emit a control deviation signal corresponding to a difference between the set value signal and the actual value signal. Also, the circuit includes an I-section connected to the subtraction station to receive the control deviation signal and to emit a corresponding output signal to the circuit output. In accordance with the invention, a blocking means is connected between the subtraction station and the I-section for selectively interrupting transmission of the deviation signal from the subtraction station to the I-section in response to an abrupt change in the set value signal at least for the duration of change in the set value signal. A control means is also connected between the set value input and the blocking means for sensing an abrupt change in the set value signal and for actuating the blocking means in response to the abrupt change.

In one embodiment, the blocking means is in the form of a switch and a relay for opening and closing the switch. In this embodiment, the control means includes a differentiator, a convertor and an expansion member. The differentiator is connected to the set value input in order to receive the set value signal and to emit a corresponding output signal. The convertor is connected to the differentiator to receive the output signal and to emit a rectified signal in response to the output signal exceeding a pre-set value. The expansion member is connected to the convertor to receive the rectified signal and to emit an expanded signal to the relay of the blocking means over an adjustable period of time for opening of the switch for this period of time.

In another embodiment, the blocking means is in the form of a multiplier while the control means includes a differentiator, a convertor and an inverter. The differentiator is connected to the set value input to receive the set value signal and to emit a corresponding output signal. The convertor is connected to the differentiator to receive the output signal and to emit—according to a trapezoidal characteristic—a rectified signal in response thereto. The inverter is connected to the convertor to receive and subtract the rectified signal from a received positive consistent signal and to emit a resulting difference signal to the multiplier in order to first close the multiplier to passage of the deviation signal and then to open the multiplier in a continuous ramp wise manner. The convertor may be in the form of a full-wave rectifier limiter for limiting the rectified signal to one unit which is equal to the consistent signal.

In either embodiment, the control circuit may include a P-section which is connected to and between the set value input and output in order to deliver the set value signal to the output in additive manner.

The method is comprised of the step of blocking the emission of a deviation signal from the subtraction station to the I-section in response to an abrupt change in the set value signal at least for the duration of change in the set value signal.

It has suprisingly been found to be better to cut the I-section of the controller out of operation for a given relatively brief time during and following an abrupt change of the set value rather than to allow the I-section to operate fairly incorrectly during this time. The method is particularly advantageous in cases where the plant characteristic alters, e.g. in dependence on load.

The control circuit has the further advantage of being readily adjustable to the plant characteristics and, where necessary, to changes in the characteristic, for example in dependence on load.

Figure 2:
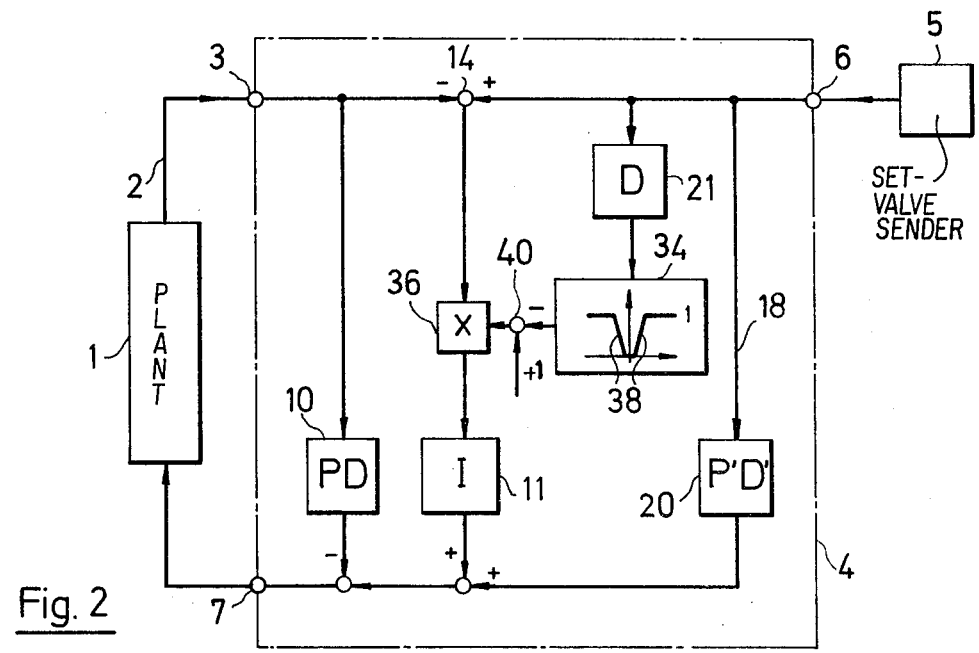

These and other objects and advantages of the invention will be come more apparent from the following detailed description taken in conjunction with the accompanying drawings in which:

FIG. 1 illustrates a schematic view of a control circuit in accordance with the invention; and FIG. 2 illustrates a schematic view of a modified control circuit in accordance with the invention.

Referring to FIG. 1, a plant 1 e.g. a steam generator has an output through which an actual value signal representing e.g. the steam flow can be transmitted as well as an input into which a control signal for controlling the plant can be delivered. The control signal influences e.g. the flow of fuel, air and feed water. As shown, the plant is controlled by a controller 4. This controller 4 has an actual value input 3 which is connected via a line 2 to the output of the plant in order to receive the actual value signal. The controller 4 also has a set value input 6 for receiving a set value signal from a suitable source such as a set-value sender 5. Further, the controller 4 has an output 7 which is connected via a line 8 to the input of the plant 1 for delivering a control signal to the plant input.

The controller 4 also includes a proportional action section or element (P-section) 10 and an integral action section or element (I-section) 11. The P-section 10 also has a differential (D)-character but may have only a pure P character. The P-section 10 is directly connected to the actual value input 3 while being connected with a negative sign with the controller output 7.

The controller 4 also has a subtraction station 14 connected to each of the inputs 3, 6 for receiving the actual value signal and set value signal. As indicated, the subtraction station subtracts the actual value signal from the set value signal in order to emit a control deviation signal corresponding to a difference between the set value signal and the actual value signal. The subtraction station 14 is connected to the I-section 11 in order to transmit the control deviation signal thereto via a blocking means in the form of a switch 16 and a relay 28.

The I-section 11 has an integrate action which serves to emit a corresponding output signal to the control deviation signal which is received. As indicated, the emitted output signal is supplied to the output 7 additively to the output of the P-section 10.

A line 18 also connects the set value input 6 to a P-section or member 20 having a characteristic, for example, P' D', different from the P D character of the P-section 10. The output of the P-section 20 is also connected additively to the controller output 7.

As shown, a control means is connected between the set value input 6 and the subtraction station 14 for sensing an abrupt change in the set value signal and actuating the blocking means in response to the abrupt change. The control means includes a differentiator 21, a convertor 24 and an expansion member 26. The differentiator 21 is connected to the line 18 via a branch line 19 in order to receive the set value signal from the input 6. The differentiator or D-section 21 emits an output signal x from an output to the convertor 24 which serves as a full-wave rectifier and as a signal limiter. The convertor 24 receives the output signal x and emits a rectified signal y in response to the output signal x exceeding a preset positive or negative amplitude or value. When this occurs, the output y of the convertor 24 rises to the predetermined positive value p whereas for the rest of the time, the output y remains at 0. The expansion member 26 is connected to the convertor 24 in order to receive the rectified signal y and to emit an expanded signal z to the relay 28 over an adjustable period of time tv for opening of the switch 16 for this period of time. The switch 16 otherwise remains closed.

In operation, in the event of an abrupt change in the set value, the input of the I-section 11 is interrupted or blocked by the switch 16 for the period of time tv so that the output of the I-section 11 is retained for the same period. The period tv is such that the disturbance caused by the abrupt change of the set value applied via the P-section 20 to the plant 1 can work itself out completely at the output of the plant before the I-section 11 cuts in again. If the P-section 20 is correctly dimensioned and if no other kind of disturbance e.g. a change of the heating value of the fuel has acted on the plant 1 during the period tv, the control deviation at the subtraction station 14 returns to near 0 upon the expiration of the period tv; if not, the I-section 11 starts at the end of the time interval tv to operate without an overshoot occurring.

Referring to FIG. 2, wherein like reference characters indicate like parts as above, the blocking means may be in the form of a multiplier 36. In this case, the control means includes a differentiator 21, a convertor 34 and an inverter 40. The differentiator 21 is connected to the line between the actual value input 6 and the subtraction station 14 in order to receive the set value signal and to emit a corresponding output signal to the convertor 34. The convertor 34 corresponds basically to the full-wave rectifier limiter 24 of FIG. 1 but has a characteristic with inclined flanks 38 instead of vertical flanks and emits an output signal which is limited to a positive consistent value. This output signal is a rectified signal which is produced according to a trapezoidal characteristic in correspondence to the received signal from the differentiator 21. The invertor 40 is connected to the convertor 34 in order to receive and subtract the rectified signal from a received positive consistent signal +1 and to emit a resulting difference signal to the multiplier 36. This difference signal is used as a multiplying input in the multiplier 36.

In operation, in the event of an abrupt change in the set value, the differentiator 21 produces a steeply rising and fairly rapidly decaying triangular signal which the convertor 34 converts to a rectified signal which descends from +1 to zero, stays at zero for a period of time which depends on duration and steepness of the set value change, and rises again to +1. This trapezoidal signal is then supplied to the inverter 40 as a value to be subtracted from the consistent signal +1. If the convertor 34 delivers a zero output signal at the invertor 40, the multiplier 36 passes the control deviation signal formed in the subtraction station 14 to the I-section 11 unchanged. If, however, the convertor 34 delivers a trapezoidal signal at the inverter 40, the multiplier 36 is first closed to the passage of the deviation signal and then opened in rampwise manner.

Basically, the circuit of FIG. 2 operates in a similar manner to the circuit of FIG. 1 but with the difference that in the case of the circuit of FIG. 2, the I-section 11 remains interrupted for a longer time in response to relatively steep changes in the set value than for less steep changes. The circuit of FIG. 2 is also very convenient insofar as apparatus is concerned in that the mechanical relay can be eliminated.

In the case of both circuits, also a ramp like change in set value causes the I-section to be interrupted for longer than it takes the set value to change.

It is to be noted that occassionally, in optimization of the P-section 20, it can be found that this section can be the same as the P-section 10. In this case, no separate P-section 10 is necessary. Instead, the control deviation signal formed at the subtraction station 14 can be supplied, in place of the set value from the sender 5, to a P-element which can be considered as the P-section 10 or P-section 20. This represents a special case. For some control functions, of course, a P-section 10 can be omitted and its function not taken over by the P-section 20.

The invention thus provides a control circuit for a controller which is able to operate in a reliable manner despite abrupt changes in the set value supplied to the controller.

The invention further provides the technique of interrupting the operation of an integral section of a controller while providing for an improved control of a plant controlled by a controller.

The output of the plant which is controlled by the inventive control circuit can be—instead of the mentioned flow—an other physical quantity e.g. a temperature, a pressure and so on of the plant or a process.

What is claimed is:

1. A control circuit for a controller comprising
a set value input for receiving a set value signal;
an actual valve input for receiving an actual value signal from an output of a plant;
an output for delivering a control signal to an input of the plant;
a subtraction station connected to each said input for subtracting said actual valve signal from said set value signal to emit a control deviation signal corresponding to a difference between said set value signal and said actual value signal;
an integral element connected to said subtraction station to receive said control deviation signal and to emit a corresponding output signal to said output;
a blocking means connected between said subtraction station and said integral element for selectively interrupting transmission of the deviation signal from said subtraction station to said integral element in response to an abrupt change in said set value signal at least for the duration of this change in said set value signal; and
a control means connected between said set value input and said subtraction station for receiving said set value signal and for sensing an abrupt change in said set value signal and connected to said blocking means for actuating said blocking means in response to said abrupt change.

2. A control circuit as set forth in claim 1 wherein said blocking means includes a switch and a relay for opening and closing said switch and said control means includes a differentiator connected to said set value input to receive said set value signal and to emit a corresponding output signal, a convertor connected to said differentiator to receive said corresponding output signal and to emit a rectified signal in response to said corresponding output signal if exceeding a preset value, and an expansion member connected to said convertor to receive said rectified signal and to emit a signal to said relay for a period of time which begins at the same time as but which ends later than said rectified signal for opening of said switch for said period of time.

3. A control circuit as set forth in claim 1 wherein said blocking means includes a multiplier and said control means includes a differentiator connected to said set value input to receive said set value signal and to emit a corresponding output signal, a convertor connected to said differentiator to receive said corresponding output signal and to emit—according to a trapezoidal characteristic—a rectified signal in response thereto, and an inverter connected to said convertor to receive and subtract said rectified signal from a positive signal of +1 value and to emit a resulting difference signal to said multiplier to first close said multiplier to passage of said deviation signal and then open said multiplier in ramp manner.

4. A control circuit as set forth in claim 3 wherein said convertor is a full-wave rectifier limiter for limiting said rectified signal to one unit equal to said consistent signal.

5. A control circuit as set forth in claim 1 which further comprises a proportional element connected to and between said set value input and said output for delivering in proportional action said set value signal to said output in additive manner.

6. A method for controlling a sluggishly reacting plant by a controller having an output for delivering a control signal, a subtraction station for subtracting an actual value signal from a set value signal and emitting a control deviation signal corresponding to a difference between said signals, and an integral element connected to the subtraction station to receive said deviation signal and to emit a corresponding output signal to the output; said method comprising the steps of sensing an abrupt change in said set value signal being delivered to the subtraction station; and
blocking transmission of a deviation signal from the subtraction station to the integral element in response to said abrupt change in said set value signal at least for the duration of said change in said set value signal.

* * * * *